July 28, 1959        R. YOUNG        2,896,310
SCALPING DIE ASSEMBLY

Filed Sept. 23, 1955        2 Sheets-Sheet 1

INVENTOR
RALPH YOUNG
BY
ATTORNEYS

July 28, 1959  R. YOUNG  2,896,310
SCALPING DIE ASSEMBLY
Filed Sept. 23, 1955  2 Sheets-Sheet 2

INVENTOR
RALPH YOUNG
BY
ATTORNEYS

United States Patent Office 2,896,310
Patented July 28, 1959

2,896,310

SCALPING DIE ASSEMBLY

Ralph Young, Toronto, Canada, assignor to The American Brass Company, Waterbury, Conn., a corporation of Connecticut Application September 23, 1955, Serial No. 536,167

2 Claims. (Cl. 29—95.1)

This invention relates to a scalping die assembly for removing a surface layer of metal from stock such as rod, wire, or tubing. In particular, this invention concerns a scalping die which has a concavely curved chip breaker surrounding its cutting edge, in order to fold and break the cuttings removed from the stock into chips of relatively small size.

In die scalping relatively short lengths of rods and tubes, the scalping die must be positioned (at least at the beginning of the scalping operation) very close to a preceding aligning die in order to minimize the length of the point that must be formed to permit inserting the rod or tube through the dies and into the jaws of the drawing tong. In such assemblies the cuttings or shavings removed by the scalping die tend to accumulate and pack in the space between the successive dies. Such accumulation is especially objectionable when the scalping die is mounted in a movable head block, for it then tends to interfere with movement of the head block.

The present invention is directed to a structure which will prevent the clogging of the space between a scalping die and a preceding aligning die. The scalping die itself is more or less conventional in that it is formed with an opening from front to back and with a peripheral cutting edge surrounding said opening at the front or entrance end of the die. The chip breaker projects forwardly of the cutting edge of the scalping die, and is formed with a peripheral concave working surface which converges inwardly and rearwardly toward said cutting edge. The curvature of said concave working face is substantially greater than that normally assumed by cuttings or shavings removed from the rod or tubing stock by the cutting edge of the shaving die. Hence when such cuttings or shavings are intercepted by the concave working surface of the chip breaker, they are caused to fold and bend to such a degree that they break into small chips which can fall easily into a collecting pan. Advantageously a multitude of steep-sided projections are formed on the concave surface of the chip breaker to aid in folding and breaking up the cuttings.

Using the chip breaker of the present invention, clogging of the scalping die, or of a limited space between it and the preceding drawing die, is avoided. In addition, the shavings are collected as small chips which pack compactly and may be much more conveniently handled and reprocessed than bulky shavings. A pan or other container for collecting chips broken up by the apparatus of this invention will hold as much as five times the weight of material, in chip form, as it could collect were the scalping die shavings not broken into small chips. This compactness of the chips continues to be of advantage in all stages of handling and reprocessing them.

For a better understanding of the present invention, reference is made to the following drawings showing preferred embodiments of the invention, in which.

Figure 1:
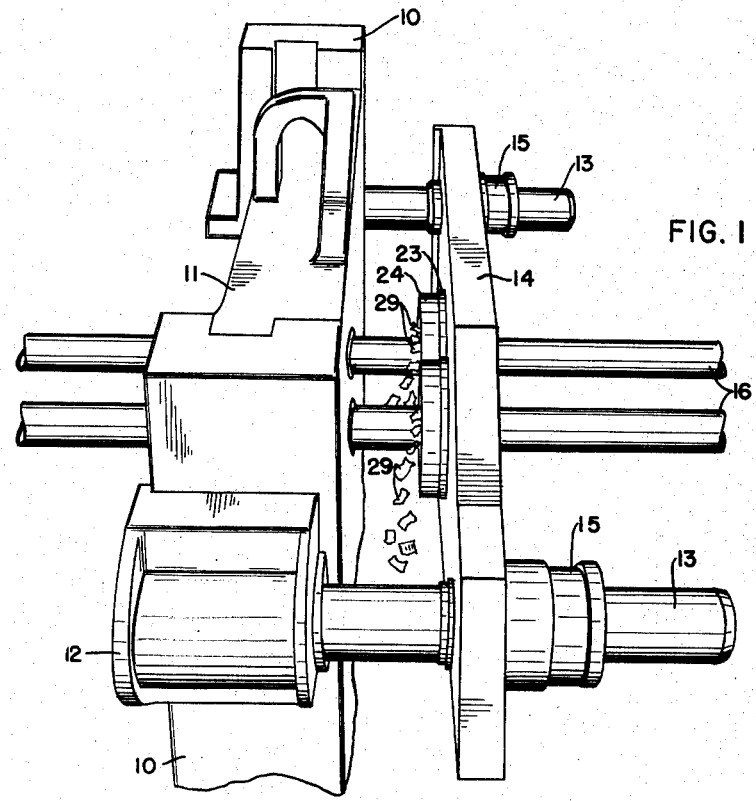
Fig. 1 shows in perspective a scalping die assembly embodying the present invention.

As shown in Fig. 1, the essential elements above the bed of a draw bench include a pair of slotted upright frame members 10 and a head block 11 having flanges which are engaged in the slots of the frame members. The frame members 10 each support a heavy bracket 12 which, in turn, supports a heavy cylindrical guide way 13. Slidably supported on the guide ways is a semi-floating head block 14 which supports a pair of scalping die assemblies in alignment with the light drawing or centering dies in the fixed head block 11. The slidable support of the semi-floating head block permits it to move from a forward position in close proximity to the head block 11 to a rearward position determined by the location of stop members 15 fastened to the guide ways at a distance from the head block, as shown in Fig. 1. For purpose of illustration it is assumed that the shape to be processed is a length of tubing 16. The nature of the dies and their support structure may best be seen in Fig. 2. The drawing or centering die 17 is mounted in a die plate 18 and is held in place by a retaining ring 19 which may be bolted to the die plate. The die plate assembly is, in turn, accommodated within an opening 20 in the head block 11 against a shoulder therein and may be bolted in place. The scalping die 21 is an annular die having an opening extending through it from front to back and having an annular cutting edge 22 at its front. It is mounted in a die plate 23, on which there is also mounted a chip breaker 24. The chip breaker may be secured in place by bolts or by any other convenient means. The chip breaker is formed with a concave working surface 25 surrounding the front face of the scalping die, and this concave surface has a smaller radius of curvature than do the shavings from the scalping die. This scalping die chip breaker assembly is accommodated as shown within an annular recess in the movable head block 14.

Figure 2:
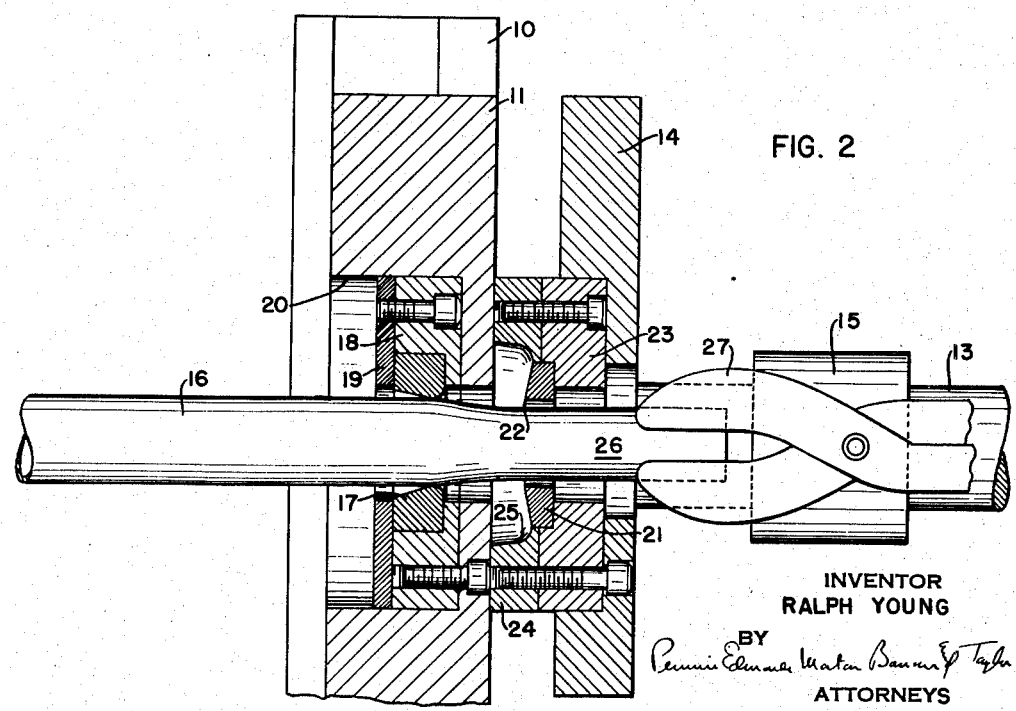
Fig. 2 is a vertical section taken through an assembly comprising a drawing die and a scalping die in their respective head blocks at the beginning of a drawing and scalping operation.
Figure 3:
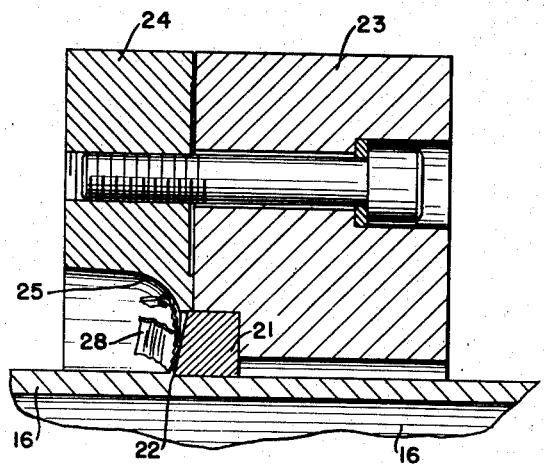
Fig. 3 is a view on an enlarged scale of one form of scalping die and chip breaker of this invention.

Fig. 2 illustrates the initial relative position of the head blocks and shows the pointed end 26 of the tubing which has been reduced in diameter enough to be inserted through the dies. At the beginning of the operation, illustrated in Fig. 2, the movable head block 14 is brought as close as possible to the fixed head block 11 so that the length of the point 26 can be minimized. The point must protrude sufficiently through the dies to be grasped in the jaws 27 of the tong by which the tubing is pulled through the dies. When tubing is being worked it is frequently drawn over a plug (not shown) to maintain the desired inside diameter. As the tong pulls the tubing, the floating head block 14 initially moves with the tubing away from the fixed head block 11 to a position at which it engages the stops 15. Thereafter, drawing and sclaping will proceed in a normal manner, the drawing die serving as alignment means for holding the tubing centered in the scalping die.

As the tubing is pulled through the drawing die 17, it is reduced in diameter by some small amount. Thereafter, as it is passed through the scalping die, shavings are cut from its outer surface. The scalping die produces shavings which would ordinarily assume a bulky curled form which would tend to accumulate and pack in the space between the movable head block and the fixed head block. Moreover, these curled shavings are inconvenient to handle and bulky to package. In accordance with the present invention, however, the shavings are forced against the concave surface 25 of the chip breaker, which has a much greater curvature (i.e., shorter radius of curvature) than the curvature normally assumed by the shavings as they pass from the cutting edge 22 of the shaving die. As a consequence, the shavings 28, which have already been made brittle by the severe working to which they have been subjected in being cut from the tubing surface by the scalping die, are bent sharply along transverse lines of stress and break into small chips (as indicated at 29 in Fig. 1) which will not clog the space between the head blocks and which may easily be handled and reprocessed.

Figure 4:
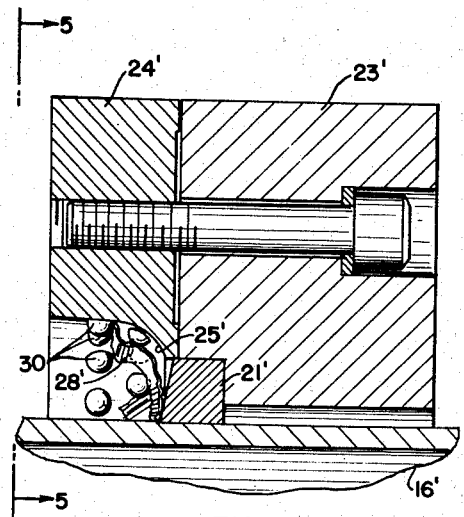
Fig. 4 is a view showing the scalping die in combination with an alternative form of chip breaker.
Figure 5:
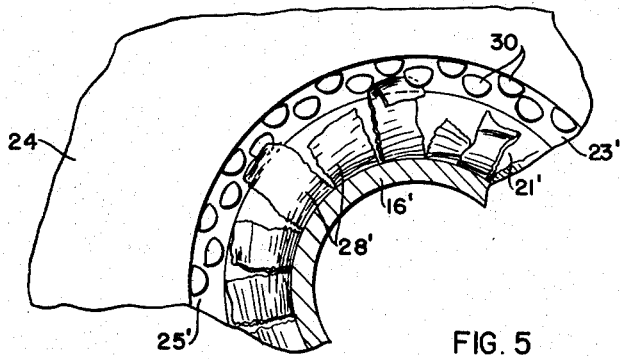
Fig. 5 is a partial plan view taken substantially along the line 5—5 of Fig. 4, showing the effect of the chip breaker on the normally long coiled and springy scalping die shavings.

In order to improve the chip breaking qualities of the die, a multitude of steep-sided projections 30 may be provided as illustrated in Figs. 4 and 5 on the concave surface of the chip breaker to intercept the shavings. These projections, which may be formed by simply depositing drops of welding filler metal on the concave surface of the chip breaker, tend to catch the advancing edges of the shavings and cause them to fold sharply and break into small chips.

Thus by means of the new scalping die and chip breaker assembly the scalping die shavings are converted to the form of compact chips which may be cleared from between the head blocks 11 and 14 easily and with no delay. As a result, the movable head block is promptly and easily returned to its position closely adjacent the fixed head block, in order to receive a new length of tubing, as soon as the scalping operation is completed. No accumulation of bulky shavings interferes with this repetitive operation and the chips themselves pack compactly for handling and reprocessing purposes.

I claim:

1. A scalping die assembly for cutting a surface layer of material from elongated metallic articles comprising a scalping die having an opening therethrough from front to back and having a peripheral cutting edge surrounding said opening at the front end thereof, and a separate chip breaker member attached to the forward portion of the scalping die assembly surrounding and projecting forward of the cutting edge, said chip breaker having a circular concave working surface which converges inwardly and rearwardly toward said cutting edge, the curvature of said concave working surface being of substantially less radius than that normally assumed by cuttings separated from the elongated articles by said cutting edge, said working face being positioned to intercept the cuttings substantially tangentially and to cause them to bend to such a degree that they break into small chips.

2. A scalping die assembly for cutting a surface layer of material from elongated articles of circular cross-section comprising a scalping die having a circular opening therethrough from front to back and having a peripheral cutting edge surrounding said opening at the front end thereof, and a separate chip breaker member attached to the forward portion of the scalping die assembly surrounding and extending forward of the cutting edge, said chip breaker having a circular concave working surface which converges inwardly and rearwardly toward said cutting edge, the curvature of said concave working surface being of substantially less radius than that normally assumed by cuttings separated from the elongated article by said cutting edge, said working face being positioned to intercept the cuttings substantially tangentially and to cause them to bend and break into small chips, and a multitude of steep-sided projections dotting said concave working surface completely around said cutting edge to aid in folding and breaking the cuttings into chips.

References Cited in the file of this patent

UNITED STATES PATENTS

| | | |
|---|---|---|
| 1,130,275 | Hartness | Mar. 2, 1915 |
| 1,854,672 | Robinson | Apr. 19, 1932 |
| 1,945,535 | Schiltz | Feb. 6, 1934 |
| 2,233,928 | Weaver | Mar. 4, 1941 |
| 2,323,700 | Bailey | July 6, 1943 |
| 2,392,285 | Gauthier | Jan. 1, 1946 |
| 2,645,471 | King | July 14, 1953 |
| 2,679,680 | Hanks | June 1, 1954 |

FOREIGN PATENTS

| | | |
|---|---|---|
| 166,403 | Germany | Dec. 28, 1905 |